(12) United States Patent
Rudd et al.

(10) Patent No.: US 7,782,809 B2
(45) Date of Patent: Aug. 24, 2010

(54) METHOD FOR EXTENDING COMMUNICATIONS PROTOCOLS OVER A DISTANCE

(75) Inventors: Clarence Charles Rudd, Noblesville, IN (US); Scott Alan Griepentrog, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1334 days.

(21) Appl. No.: 10/910,471

(22) Filed: Aug. 3, 2004

(65) Prior Publication Data

US 2005/0058091 A1    Mar. 17, 2005

Related U.S. Application Data

(63) Continuation-in-part of application No. 10/134,163, filed on Apr. 26, 2002, now abandoned.

(60) Provisional application No. 60/347,386, filed on Jan. 10, 2002.

(51) Int. Cl.
    *H04B 7/14* (2006.01)
(52) U.S. Cl. .................. 370/315; 370/255; 370/338; 370/352; 370/424; 370/447; 455/9; 455/13.1; 455/436; 709/248; 726/13
(58) Field of Classification Search .................. 370/401, 370/353–356, 501, 255, 315, 338, 352, 424, 370/428, 445, 447, 466; 455/9, 13.1, 436; 709/248; 726/13
    See application file for complete search history.

(56) References Cited

U.S. PATENT DOCUMENTS

| | | | |
|---|---|---|---|
| 4,313,197 A | 1/1982 | Maxemchuk | |
| 4,813,040 A | 3/1989 | Futato | |
| 5,121,385 A | 6/1992 | Tominaga et al. | |
| 5,457,684 A | 10/1995 | Bharucha et al. | |
| 5,559,792 A | 9/1996 | Bottoms et al. | |
| 5,625,678 A * | 4/1997 | Blomfield-Brown | 379/93.08 |
| 5,684,801 A * | 11/1997 | Amitay et al. | 370/447 |
| 5,787,088 A | 7/1998 | Dagdeviren et al. | |
| 5,787,345 A * | 7/1998 | Moon | 455/436 |
| 5,901,341 A * | 5/1999 | Moon et al. | 455/9 |
| 6,130,916 A | 10/2000 | Thomson | |
| 6,259,792 B1 | 7/2001 | Lambrecht | |
| 6,330,245 B1 * | 12/2001 | Brewer et al. | 370/424 |
| 6,343,083 B1 * | 1/2002 | Mendelson et al. | 370/466 |
| 6,446,127 B1 * | 9/2002 | Schuster et al. | 709/227 |
| 6,456,631 B1 * | 9/2002 | Nomura | 370/466 |
| 6,466,588 B1 | 10/2002 | Michaels | |
| 6,697,603 B1 * | 2/2004 | Lovinggood et al. | 455/13.1 |
| 6,744,753 B2 * | 6/2004 | Heinonen et al. | 370/338 |

(Continued)

*Primary Examiner*—Gerald Gauthier
(74) *Attorney, Agent, or Firm*—Robert D. Shedd; Robert B. Levy; Wan Yee Cheung

(57) ABSTRACT

A communications system (30) enables two communications devices (10, 12) to communicate with each other over an extended distance using a limited range communication protocol, such as the IrDA or Bluetooth protocol. The communications system includes a pair of repeaters (32, 34), each having a protocol stack (38) that includes a portion of the limited range communications protocol. The repeaters communicate with each other over an extended range communications channel (36) such as the PSTN, while each communications device utilizes its native, limited range communications technique to communicate with an associated repeater. Thus, each communications device can readily communicate with another like device using its native protocol over a distance otherwise beyond the range of that technique.

17 Claims, 1 Drawing Sheet

U.S. PATENT DOCUMENTS

| | | | |
|---|---|---|---|
| 6,857,021 B1 * | 2/2005 | Schuster et al. | 709/227 |
| 6,888,811 B2 * | 5/2005 | Eaton et al. | 370/338 |
| 6,907,472 B2 * | 6/2005 | Mushkin et al. | 709/248 |
| 6,930,987 B1 * | 8/2005 | Fukuda et al. | 370/328 |
| 7,013,482 B1 * | 3/2006 | Krumel | 726/13 |
| 7,031,267 B2 * | 4/2006 | Krumel | 370/255 |
| 7,522,563 B2 * | 4/2009 | Rhee | 370/338 |
| 7,570,656 B2 * | 8/2009 | Raphaeli et al. | 370/445 |
| 2001/0030950 A1 * | 10/2001 | Chen et al. | 370/329 |
| 2002/0001317 A1 | 1/2002 | Herring | |
| 2002/0056114 A1 * | 5/2002 | Fillebrown et al. | 725/78 |
| 2005/0058091 A1 * | 3/2005 | Rudd et al. | 370/315 |
| 2009/0172083 A9 * | 7/2009 | Fillebrown et al. | 709/203 |

* cited by examiner

METHOD FOR EXTENDING COMMUNICATIONS PROTOCOLS OVER A DISTANCE

CROSS-REFERENCE TO CONTINUING APPLICATION

This application constitutes a continuation-in-part of co-pending U.S. patent application Ser. No. 10/134,163, filed Apr. 26, 2002, now abandoned, which claims priority under 35 U.S.C. 119(e) to U.S. Provisional Patent Application 60/347,386, filed Jan. 10, 2002.

TECHNICAL FIELD

This invention relates to a technique for data communication between wireless devices over a distance.

BACKGROUND ART

Presently, different types of data communications devices, such as lap top computers, and Personal Data Assistant devices (PDAs), incorporate an infrared data communications port for transmitting data to, and receiving data from a device that has a similar type infrared data communications port. Some computer peripheral devices, such as printers, also have an infrared data communications port for receiving infrared signals from a lap top computer or PDA to allow wireless receipt of data by such a peripheral device. While different protocols exist to facilitate communication of data via infrared signals, the IrDA protocol established by the Infrared Data Association, an industry-based standards body, has achieved widespread acceptance as the infrared data communications protocol of choice for many manufacturers of data communications devices and peripherals.

Providing a data communication device such as a laptop computer or PDA with an infrared data communication port allows a user to accomplish data exchange with a data communication device or peripheral device that likewise has an infrared data communications port without the need for any cable linking the devices. Indeed, the user need only position his/her data communication device generally within the line of sight of the recipient device to send data thereto and to receive data therefrom via infrared beams.

Another wireless communications protocol is the Bluetooth protocol. The Bluetooth communications protocol allows devices so equipped with this protocol to exchange information over Radio Frequency channel, as compared to the IrDA protocol, which utilizes an infrared beam. In contrast to the IrDA protocol, the Bluetooth protocol doesn't suffer from a line of sight restriction.

Current day wireless communications protocols, such as the above-described IrDA and Bluetooth protocols typically make use of relatively low power transceivers within the device, affording a relatively short communication range. For, example present day devices utilizing the IrDA protocol often have a communication of about 3 meters, while Bluetooth-equipped devices often have a communication range of 100 meters. Safety constraints, radio frequency interference issues, and power consumption constraints all play a role in limiting the range these communications protocols.

Many users of communications devices that embody such present-day limited range communication protocols often desire to exchange information with other device users but cannot do so using such communication protocols because the distance between devices exceeds the maximum allowable range. While other communications techniques do exist which have a longer range, such techniques have a different user interface, making ease of use more difficult.

Thus, a need exists for a communication technique capable of extending the range of a limited range communications protocol such as the IrDA and Bluetooth Protocols.

BRIEF SUMMARY OF THE INVENTION

Brief, in accordance with the present principles, there is provided a method for communicating information over an extended distance between first and second communications devices, each employing a limited range communications protocols. Such limited range protocols can include the IrDA and Bluetooth protocols. The method commences upon the receipt at a first repeater station of a communications packet, sent from the first communications device via the limited range communications protocol. The first repeater station has a protocol stack containing at least a portion of the limited range communications protocol to enable receipt of the communications packet from the first device transmitted using the limited range communications protocol. The first repeater then forwards the communications packet across an extended range communications channel (e.g., a phone line or broadband link) via a protocol different than the limited range communications protocol to a second repeater station having protocol stack that also contains at least a portion of the limited range communications protocol. The second repeater transmits the communications packet to the second user via the limited range communications protocol. In this way, the first and second communications devices can exchange information using their native communications protocol over an extended distance.

DETAILED DESCRIPTION

Figure 1:
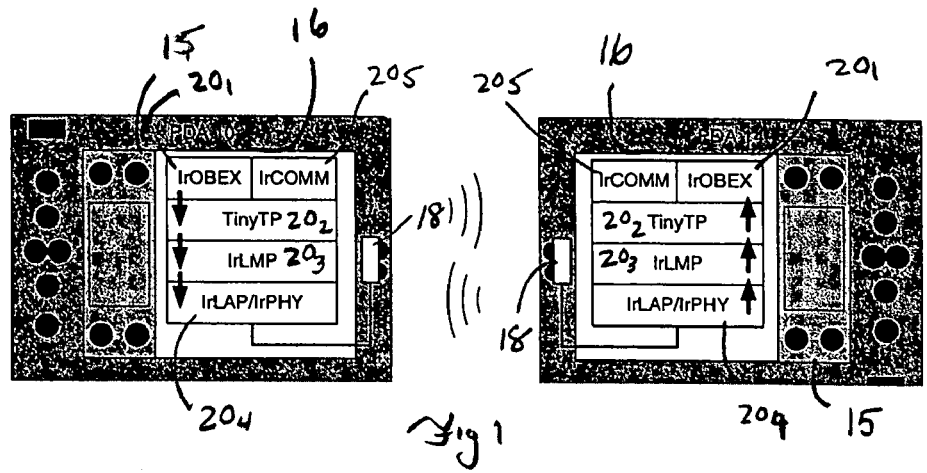
FIG. 1 discloses a block schematic diagram of a pair of portable data communications devices communicating via a limited range communications protocol in accordance with the prior art.

The communications technique of the present principles enables two communications devices, each using a limited range communications protocol, to communicate over an extended distance. To best understood the technique of the present principles, a understanding of how such devices communicate using the limited range communications will prove helpful. FIG. 1 depicts a block schematic of first and second of portable data communications 10 and 12 devices communicating via a limited range communications protocol in accordance with the prior art. In embodiment of FIG. 1, the portable communications devices 12 and 14 take the form of a Personal Data Assistant (PDA) that communicate with each other an infra red beam using the IrDA communications protocol. Alternatively, the PDAs 10 and 12 could user another other limited range communication protocol such as the Bluetooth protocol. Presently both the Bluetooth and IrDA protocols enjoy application in a wide variety of communications devices other than PDAs 10 and 12.

Both of the PDAs 10 and 12 of FIG. 1 have the same structure, so like numbers designate the same element in each device. Each PDA includes a processor 15 that executes an operating program that implements a communications protocol having individual protocols stored in a stack 16. In the illustrated embodiment, the stack 16 stores a set of individual protocols $20_1$-$20_4$, which collectively implement the IrDA protocol, thus allowing the PDA to send and receive communications packets to another PDA via an infrared transceiver 18.

To better understand the IrDA protocol, consider each of the individual protocols $20_1$-$20_4$ stored in the stack 16. During a simple transmission of information from the PDA 10 to the PDA 12, the processor 14 in the PDA 10 operating under control of the an operating system first activates a high-level protocol $20_1$, typically the IrOBEX protocol, to initiate the transfer of desired information. The IrOBEX protocol $20_1$ activates a transport protocol $20_2$, such as the TinyTP protocol, at a level below the IrOBEX protocol, to provide reliable transport. Activating the TinyTP protocol $20_2$ activates a link layer protocol $20_3$, such as the IrLMP protocol, residing below the Tiny Tp protocol, to create a communications link to the other PDA for transport.

The IrLMP protocol $20_3$ activates a physical layer protocol $20_4$ below the IrLMP protocol to locate the other PDA for linkage. The physical layer protocol typically includes the IrLAP protocol which makes use of the IrPHY protocol to handle the packetization of the data converted by the IR 18 transceiver into bursts of infrared light conforming to the IrDA physical interface specification.

Upon receipt of the communications packet at the PDA 12, the above-described protocols $20_1$-$20_4$ in the stack 16 of that PDA operate in reverse. In other words, the IrLAP/IrPHY protocol $20_4$ at the bottom of the stack operates to receive packets, whereas the IrLMP protocol $20_3$ operates to answer a request for a connection. The TinyTP protocol $20_2$ provides reliable transport so that the actual data record desired can be conveyed using the IrOBEX protocol $26_1$, at the top of the stack of the receiving PDA 12. In the illustrated embodiment, each PDA can also include one or more additional protocols, such as the IrComm protocol $20_5$ which are not active during an IrOBEX exchange as described above.

The above described method only works when the PDAs 10 and 12 lie within the visible IR range of each other (about 3 meters). A similar limitation (about 100 meters) exists where the PDAs utilize the Bluetooth radio protocol rather than the IrDA protocol.

Figure 2:
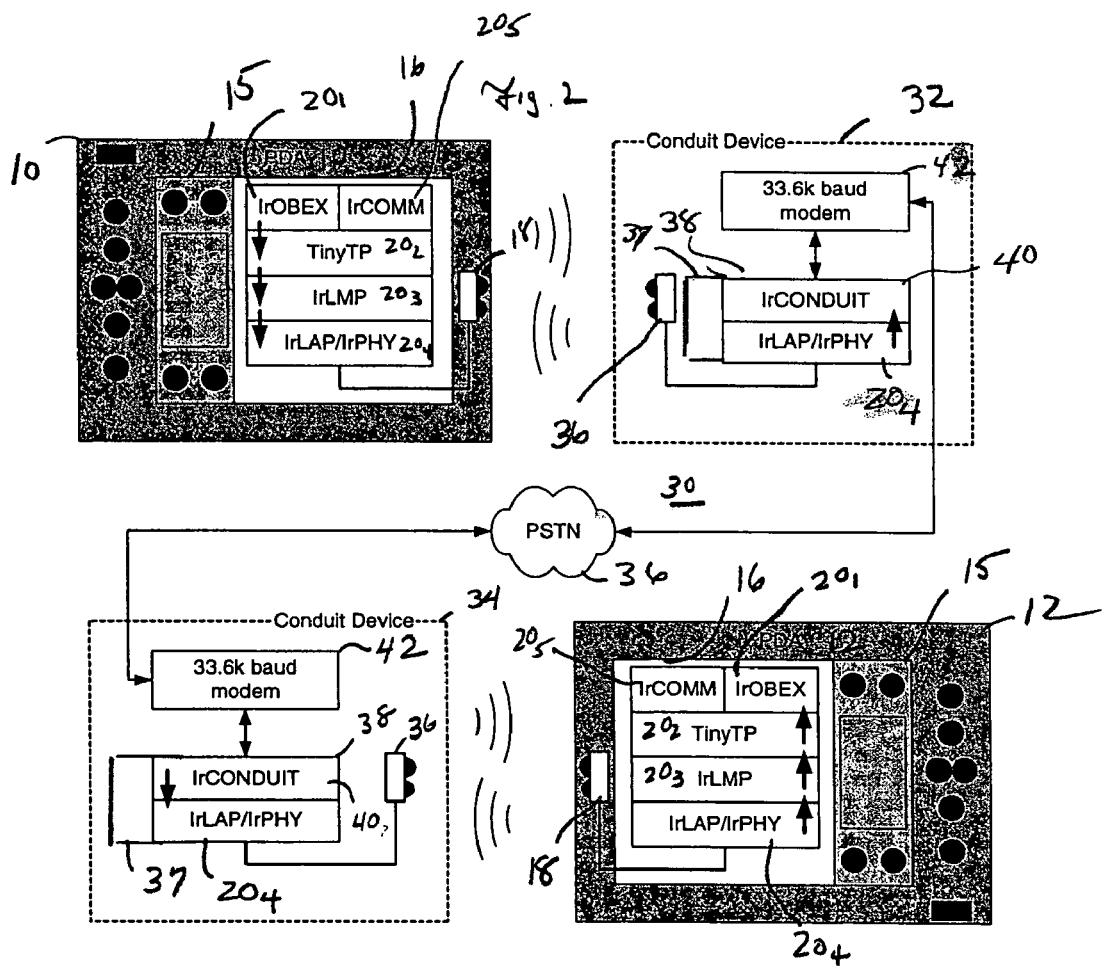
FIG. 2 discloses a block schematic diagram of a communications system in accordance with the present principles for enabling the portable communications devices of FIG. 1 to communicate with each other over an extended distance using their native, limited range communications protocols.

FIG. 2 depicts a communications system 30 in accordance with a preferred embodiment of the present principles for enabling two communications devices, such as the PDAs 10 and 12, to communicate over an extended distance using a limited range communications protocol, such as IrDA or Bluetooth protocols. In other words, the communications system 30 of FIG. 2 allows the PDAs 10 and 12 to communicate using a low range communications protocol, in the manner described above, but over a distance that heretofore exceeded the range of such a protocol. In this regard, not only the IrOBEX protocol $20_1$ can be conveyed using the method of present principles, but also the IrComm protocol $20_5$, as well as any other protocol used above the IrLAP protocol layer.

The communications system 30 comprises a pair of repeaters, 32 and 34 linked by a communications network 36, illustratively represented by the Public Switched Telephone Network (PSTN). The network 36 could take on other forms such as a Local Area Network, a Wide Area Network, a wireless network, (e.g., cellular or Wi-Fi), a corporate Intranet, or the Internet, or some combination of networks. Each of the repeaters 32 and 34 has the same structure and therefore only the details of repeater 32 appear here. The repeater 32 includes an IR transceiver 36 that has the same structure and operates in the same manner as the transceiver 18 in each of the PDAs 10 and 12. Thus, the transceiver 36 of FIG. 2 sends and receives communications packets in accordance with the IrDA protocol. The transceiver 36 connects to a processor 37, which executes an operating system that relies on a communications protocol comprised of a plurality of individual protocols stored in a stack 38.

The communications protocol implanted by the processor 37 within each of the repeaters 32 and 34 will implement the limited range communications protocol of the PDAs 10 and 12. Thus, the protocol stack 38 within each repeater 32 will contain some but not all of the same protocols as the protocol stack 16 in each of the PDAs 10 and 12. In the illustrated embodiment, the protocol stack 38 contains a slightly modified version of IrLAP/Ir/PHY protocol $20_4$ that is contained in the protocol stack 16 in each PDA. The presence of the IrLAP/Ir/PHY protocol $20_4$ facilitates the transfer of communications packets formatted in the IrDA protocol between the processor 37 and the transceiver 36, thus allowing each repeater to exchange such communications packets with an associated PDA.

Unlike the protocol stack 16 within each of the PDAs 10 and 12 that includes the IrOBEX, TinyTP, and IrLMP protocols $20_1$, $20_2$ and $20_3$, respectively, the protocol stack 38 contains a protocol IrConduit 40 which recognizes a communications attempt from a PDA or a similar device using the IrDA protocol. In response, the IrConduit protocol will establish a data connection via a modem 42 to the repeater 34 through communications network 36 to enable communications with the PDA 12 associated with repeater 34.

The structure of the modem 42 in each of the repeaters 32 and 34 will depend in large measure on the nature of the communications network 36 that carries packets between repeaters. In the illustrated embodiment where the communications network comprises the PSTN 36, the modem 42 in each of the repeaters 32 and 34 typically comprises a telephony-type data modem having a data rate of 33.6 K baud although a higher data rate will assure faster data communications. As discussed, the network 36 can take other forms, and to that end, the modem 42 in each repeater will have a structure compatible the network.

To best understand the manner in which the communications system 30 of the present invention enables communication between the PDAs 10 and 12 across a distance greater than the limited range of the IrDA protocol, consider the exchange of a contact record between the two PDAs as described above with respect to FIG. 1. To exchange a record with the PDA 12, the PDA 10 attempts an communications exchange with the repeater 32. The repeater 32 recognizes the attempt to communicate (using its implementation of the IrLAP protocol $20_4$). The IrConduit protocol 40 establishes a data connection through the modem 42 to the modem 42 in the repeater 34 across the PSTN 36. After establishing a connection, the IrDA commands embodied in the IrPHY and IrLAP protocol $20_4$ of the repeater 32 enable the PDA 10 to search for, and establish a connection with the PDA 12 via the repeater 34, thus enabling the exchange of data, just as if the two PDAs lay within the limited distance required for the IrDA protocol. Once the PDAs 10 and 12 have completed the transfer, the repeaters 32 and 34, respectively, can disconnect, either in response to a command from one of the PDAs, or in response to a time out.

By interpreting and manipulating the IrDA data packets as they are received, the repeaters 32 and 34 permit a connection between the PDAs 10 and 12 to progress normally, such that the PDAs appear to each other as being directly connected. The method of the preset principles also has applicability for transporting Bluetooth data packets that use the same low level protocols as IrDA. Depending on the speed of the media (e.g. 33.6 k baud modem, or 10 mbit/sec LAN) the communication speed between the PDAs across the network 36 may be slower that what would be possible with the devices in direct range of each other (115 k baud). There may also be a delay in starting up a communication with a remote device as compared with one in direct range, due to time needed to establish the long distance connection between the conduit devices.

The foregoing describes a technique for enabling two communications device to communicate over an extended distance using a limited range communications protocol.

What is claimed is:

1. A method for communicating information between first and second communications devices, each of said first and second communications devices having a limited range communication capability via a limited range communications protocol stack, the method comprising:

receiving a communications packet, sent from the first communications device via a limited range communications protocol for initiating communication with said second communications device, at a first repeater station having a protocol stack containing a protocol for establishing connection with a second repeater station and only a portion of the limited range communications protocol stack; and forwarding the communications packet from the first repeater station across an extended range communications channel to the second repeater station having a protocol for communicating with the first repeater station and only a portion of the limited range communications protocol stack to enable transmission of the communications packet by the second repeater station to the second communications device via the limited range communications protocol, wherein physical layer communication across the extended range communications channel is preserved in originating form, and wherein communication is established between the first and second communications devices over a range greater than the limited range communication capability.

2. The method according to claim 1 wherein the limited range communications protocol comprises an IrDA protocol.

3. The method according to claim 1 wherein the limited range communications protocol comprises a Bluetooth protocol.

4. The method according to claim 1 wherein the step of forwarding the communications packet further comprises the step of transmitting the packet across a Public Switched Telephone Network.

5. The method according to claim 1 wherein the step of forwarding the communications packet further comprises the step of transmitting the packet across a Local Area Network.

6. The method according to claim 1 wherein the step of forwarding the communications packet further comprises the step of transmitting the packet across a Wide Area Network.

7. The method according to claim 1 wherein the step of forwarding the communications packet further comprises the step of transmitting the packet across a wireless network.

8. The method according to claim 1 wherein the step of forwarding the communications packet further comprises the step of transmitting the packet across the Internet.

9. A method for communicating information between first and second communications devices, each of said first and second communications devices having a limited range communication capability via at least an IrDA protocol in an IrDA protocol stack, the method comprising:

receiving a communications packet, sent from the first communications device via the IrDA protocol for initiating communication with said second communications device, at a first repeater station having a protocol stack containing a protocol for establishing connection with a second repeater station and only a portion of the IrDA protocol stack; and forwarding the communications packet from the first repeater station across an extended range communications channel to a second repeater station having a protocol for communicating with the first repeater station and only a portion of the IrDA protocol stack to enable transmission of the communications packet by the second repeater station to the second communications device via the IrDA protocol, wherein physical layer communication across the extended range communications channel is preserved in originating form, and wherein communication is established between the first and second communications devices over a range greater than the limited range communication capability.

10. The method according to claim 9 wherein the step of forwarding the communications packet further comprises the step of transmitting the packet across a Public Switched Telephone Network.

11. The method according to claim 9 wherein the step of forwarding the communications packet further comprises the step of transmitting the packet across a Local Area Network.

12. The method according to claim 9 wherein the step of forwarding the communications packet further comprises the step of transmitting the packet across a Wide Area Network.

13. The method according to claim 9 wherein the step of forwarding the communications packet further comprises the step of transmitting the packet across a wireless network.

14. The method according to claim 9 wherein the step of forwarding the communications packet further comprises the step of transmitting the packet across the Internet.

15. A communications apparatus for communicating information between first and second communications devices, each of said first and second communications devices having a limited range communication capability via a limited range communications protocol stack, the communications apparatus comprising:

means for receiving a communications packet, sent from the first communications device via a limited range communications protocol for initiating communication with said second communications device, a processor having a protocol stack containing a protocol for establishing connection with a second communications apparatus and only a portion of the limited range communications protocol stack, which when executed by the processor, accomplishes forwarding the communications packet across an extended range communications channel for receipt by the second communications apparatus having a protocol for communicating with the first communications apparatus and only a portion of the limited range communications protocol stack to enable transmission of the communications packet by the second communications apparatus to the second communications device via the limited range communications protocol wherein physical layer communication across the extended range communications channel is preserved in originating form, and wherein communication is established between the first and second communica tions devices over a range greater than the limited range communication capability.

16. The apparatus according to claim 15 wherein the limited range communications protocol comprises an IrDA protocol.

17. The apparatus according to claim 15 wherein the limited range communications protocol comprises a Bluetooth protocol.

* * * * *